United States Patent [19]

Yamaguchi et al.

[11] Patent Number: 4,626,469
[45] Date of Patent: Dec. 2, 1986

[54] MAGNETIC RECORDING MATERIAL

[75] Inventors: Nobutaka Yamaguchi; Kenichi Masuyama; Shinobu Iida; Masaaki Fujiyama, all of Kanagawa, Japan

[73] Assignee: Fuji Photo Film Co., Ltd., Kanagawa, Japan

[21] Appl. No.: 505,505

[22] Filed: Jun. 17, 1983

[30] Foreign Application Priority Data

Jun. 18, 1982 [JP] Japan .................... 57-105162

[51] Int. Cl.⁴ .................................. G11B 5/72
[52] U.S. Cl. ............................ 428/323; 360/131; 428/694; 428/900
[58] Field of Search .......... 428/694, 695, 323; 360/131

[56] References Cited

U.S. PATENT DOCUMENTS 3,423,233  1/1969  Akashi et al. .................. 428/900
4,015,042  3/1977  Chassaigne .................... 428/325
4,135,031  1/1979  Akashi et al. .................. 428/323
4,320,159  3/1982  Ogawa et al. .................. 428/64

FOREIGN PATENT DOCUMENTS 134406    4/1977  Japan ............................ 428/328
53-20203  6/1978  Japan .
54-9041   4/1979  Japan .

Primary Examiner—George F. Lesmes
Assistant Examiner—William M. Atkinson
Attorney, Agent, or Firm—Sughrue, Mion, Zinn Macpeak & Seas

[57] ABSTRACT

A magnetic recording material, which comprises a magnetic layer coated on a non-magnetic support is disclosed. The magnetic layer contains both carbon black fine powder having a mean primary grain size of less than 10 mμ and carbon black coarse powder having a mean primary grain size in the range of 50 to 120 mμ in a mixing ratio ranging from 95/5 to 5/95. The material is improved in both RF output and audio output.

7 Claims, 4 Drawing Figures

MAGNETIC RECORDING MATERIAL

FIELD OF THE INVENTION

This invention relates to a magnetic recording material and, more particularly, to an improvement in electromagnetic properties of a magnetic recording material.

BACKGROUND OF THE INVENTION

Magnetic recording materials, more particularly video tapes which record information in short wavelengths, require excellent video electromagnetic properties. Therefore, it is desired to improve surface smoothness of the magnetic layer. On the other hand, improvement in audio electromagnetic properties are also required of the magnetic recording materials, and it is desired to increase the amount of a magnetic powder in the magnetic layer.

Hitherto, carbon black has been incorporated in a magnetic layer of a magnetic recording material mainly for the purpose of preventing the generation of static charges. Carbon black used generally has a mean primary grain size of 10 to 150 m$\mu$. In such a case, however, both surface smoothness of the magnetic layer and amount of a magnetic powder to be included in the magnetic layer are not satisfactory at the same time so that a magnetic recording material excellent in both video and audio electromagnetic properties has not been produced.

In addition, incorporation of a mixture of carbon black having a mean primary grain size of 10 to 30 m$\mu$ with carbon black having a mean primary grain size of 60 to 120 m$\mu$ was proposed with the intention of increasing the abrasion resistance and preventing a curling phenomenon (Japanese Patent Publication Nos. 9041/79 and 20203/78), but only unsatisfactory results were obtained.

SUMMARY OF THE INVENTION

A primary object of this invention is to provide a magnetic recording material which can generate both RF (radio frequency) and audio outputs having high powers and excellent characteristics.

As a result of various examinations, it has now been found that remarkably favorable results can be obtained using a particular carbon black mixture described below.

That is, the present invention provides a magnetic recording material comprising a non-magnetic support having coated thereon a magnetic layer containing both carbon black fine powder having a mean primary grain size of less than 10 m$\mu$ (hereinafter referred to as "fine grain carbon") and carbon black coarse powder having a mean primary grain size of from 50 m$\mu$ to 120 m$\mu$ (hereinafter referred to as "coarse grain carbon") at a mixing ratio of from 95/5 to 5/95 by weight.

Figure 1A:
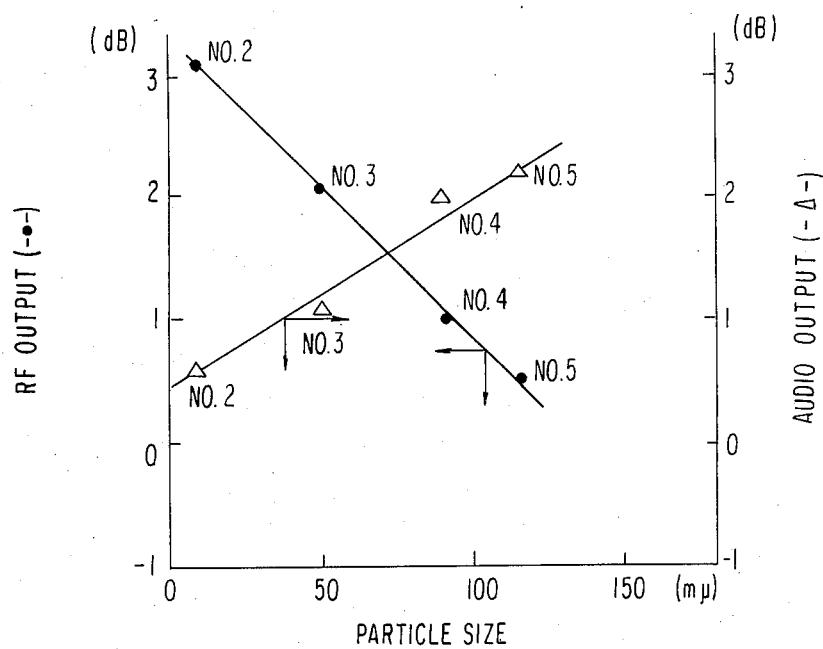
FIGS. 1-(a) and 1-(b) are graphic illustrations of characteristics of magnetic recording materials in which single carbon black powder is used, wherein FIG. 1-(a) includes graphs showing the RF output (—●—) and the audio output (—▲—) as a function of grain size, and FIG. 1-(b) includes graphs showing the surface smoothness (—Δ—) and the maximum magnetic flux density (—○—) as a function of grain size.

Therein No. designates the sample No. prepared in the examples and comparative examples.

DETAILED DESCRIPTION OF THE INVENTION

The fine grain carbon to be employed in the present invention is a carbon black powder having a mean primary grain size less than 10 m$\mu$, preferably within the range of 1 to 9 m$\mu$, and more particularly within the range of 5 to 9 m$\mu$.

The coarse grain carbon to be employed in the present invention is a carbon black powder having a mean primary grain size of from 50 to 120 m$\mu$, preferably from 60 to 100 m$\mu$. If the coarse grain carbon has a grain size larger than 120 m$\mu$, surface properties are deteriorated, whereas if it has a grain size smaller than 50 m$\mu$, the amount of magnetic substance in the magnetic layer is lowered.

A mixing weight ratio of the fine grain carbon to the coarse grain carbon ranges from 95/5 to 5/95, preferably from 80/20 to 20/80, and more preferably from 70/30 to 30/70.

The total of both type of carbon is preferably 1 to 20 parts by weight, more preferably 3 to 15 parts by weight, per 100 parts by weight of magnetic powder. If the amount is small, an antistatic effect tends to decrease, whereas if it is large, the amount of magnetic powder in the magnetic layer is reduced and surface properties of the magnetic layer coated are deteriorated.

In preparing a magnetic coating composition, carbon black powders can be added by any conventional means. For example, the fine grain carbon and the coarse grain carbon may be mixed simultaneously with a magnetic powder and a binder, or they may be mixed separately with a magnetic powder and a binder. In case of separate addition, the fine grain carbon, which is difficult to disperse, may be added first to a magnetic composition, and at the time when the dispersion has proceeded to some extent, the coarse carbon may be added thereto. In another manner, a part or all of the carbon is kneaded together with a part of a binder using an apparatus such as a kneader or the like in advance, and a magnetic coating composition may be prepared using the resulting uniform mixture. It is preferred that carbon black is previously kneaded together with a binder, or both a binder and a magnetic powder, and thereafter, dispersion is carried out to prepare a magnetic coating composition, since dispersibility is increased, surface smoothness of the resulting magnetic layer is improved and the amount of magnetic powder in the magnetic layer is increased.

Examples of magnetic powders which can be used in the present invention include all of ferromagnetic powders which have so far been used in magnetic recording materials, e.g., ferromagnetic iron oxide powders such as $\gamma$-Fe$_2$O$_3$, FeO$_x$ (1.33<x<1.5), etc.; Co-added ferromagnetic iron oxides such as Co-added $\gamma$-Fe$_2$O$_3$, Co-added FeO$_x$ (1.33<x<1.5), etc.; ferromagnetic chromium dioxide powder; ferromagnetic metal powders such as Fe powder, Co powder, Ni powder, Fe-Co-Ni alloy powder, Fe-Zn alloy powder, etc.; plate-form barium ferrite; mixtures of two or more of powders described above; and so on. Of these, Co-added ferromagnetic iron oxides are preferably used in connection with the present invention. The ferromagnetic powder may be in any form, e.g. a grain, needle, a spindle, etc., and needle form powder is preferred. The ferromagnetic powders having various forms may be optionally mixed.

Polymers such as vinyl chloride-vinyl acetate copolymers, cellulose derivatives, polyurethanes, nitrilebutadiene rubber, styrene-butadiene rubber, polyesters, polyamides, polyisocyanates, epoxy resins, etc., which have been used as a conventional binder independently or in a form of mixture thereof, can be used as the binder in the present invention. Of these, vinyl chloride-vinyl acetate copolymers, cellulose derivatives, polyurethanes, polyisocyanates, polyamides and epoxy resins are preferably used, and the first four polymers are particularly preferred.

Suitable non-magnetic supports which can be used in the present invention include a polyethylene terephthalate film, a polyethylene naphthalate film, a polyamide film, a polyimide film, a vinyl chloride copolymer film, etc., with a polyethylene terephthalate film and a polyethylene naphthalate film being preferred. The support preferably has a thickness of from 3 to 50 $\mu$m and more preferably from 5 to 30 $\mu$m. These films having back layers may be also used. The both sides of the support may differ in surface smoothness, if necessary.

On the back side of the support (the side opposite to the magnetic layer), a lubricant or a surface active agent may be optionally coated. The coating of the lubricant or the surface active agent may be carried out after the coating of the magnetic layer, or after the calender processing (the surface-smoothening processing) of the magnetic layer.

A lubricant, a dispersing agent, a stabilizing agent, a plasticizer, an abrasive and other various additives which can be added to the magnetic layer of the present invention are those described in, e.g., U.S. Pat. No. 4,135,016 and Japanese Patent Publication No. 26890/81.

For example, lubricants include fatty acids, fatty acid esters, fatty acid amides, sorbitane fatty acid ester, liquid paraffin, silicone, fluorine-containing oils and so on. Dispersing agents include lecithin, sodium oleate, etc. Stabilizing agents include metallic soaps, dibutyltin dicarboxylate, etc. Plasticizers include dibutyl phthalate, tricresyl phosphate, triphenyl phosphate, etc. In addition, solid lubricants such as graphite, MoS$_2$ and the like can be added, if desired.

Suitable abrasives which can be incorporated in the magnetic layer of the present invention have a mean particle size of 0.1 to 1 $\mu$m, preferably 0.2 to 0.8 $\mu$m, and a Mohs' hardness of not less than 6, preferably not less than 8. These abrasives can be employed in an amount of 0.5 to 20 parts by weight per 100 parts by weight of the magnetic powder. If much importance is attached to video electromagnetic properties, it is preferred to add the abrasives in a larger amount from the standpoint of polishing a video head and keeping it clean, and it is desirably not less than 1 part by weight. If the abrasive is added too much, the head is worn to excess, and the proportion of magnetic powder in the magnetic layer is decreased. Taking into account the balance between these factors, the abrasives are preferably added in an amount of 1 to 10 parts by weight, more preferably 3 to 8 parts by weight.

The present invention will now be illustrated in more detail by reference to the following examples. However, the present invention is not limited in scope to these examples. In the following examples, all parts are by weight unless otherwise indicated.

EXAMPLE 1

| Composition A: | |
| --- | --- |
| Co—added $\gamma$-Fe$_2$O$_3$ | 100 parts |
| Fine Grain Carbon | 3 parts |
| (Mean primary grain size: 9 m$\mu$) | |
| Nitrocellulose | 10 parts |
| Composition B: | |
| Coarse Grain Carbon | 3 parts |
| (Mean primary grain size: 90 m$\mu$) | |
| Polyurethane | 5 parts |
| Cr$_2$O$_3$ | 7 parts |
| Liquid Paraffin | 1 part |
| Composition C: | |
| Polyisocyanate | 8 parts |
| Solvent: | |
| Cyclohexanone/Methyl Ketone (1/1) | 270 parts |

Both the composition A and the composition B were dispersed in a ball mill. Thereafter, the composition C was poured thereinto with stirring to prepare a magnetic coating composition.

This magnetic coating composition was coated on a 15 $\mu$m-thick polyethylene terephthalate film, which had a back layer constituted with an inorganic pigment and a binder (thickness: 1 $\mu$m), in a dry thickness of 5 $\mu$m using a doctor coating process. Then, it was subjected to a calender roll processing for smoothening the surface of the magnetic layer coated. The thus obtained wide film was slit into video tapes at a width of ½ inch to be used in a VHS type VTR. The video tape is named Sample No. 1.

COMPARATIVE EXAMPLE 1

Sample Nos. 2 to 5 were obtained in the same manner as in Example 1 except that carbon black having a mean primary grain size of 9 m$\mu$, that of 50 m$\mu$, that of 90 m$\mu$, and that of 115 m$\mu$ were used in a single form (in an amount of 6 parts), respectively, in place of the mixed form.

EXAMPLE 2

Sample Nos. 6 to 11 were obtained in the same manner as in Example 1 except that mixing ratios of the fine grain carbon to the coarse grain carbon were altered to 95/5, 90/10, 80/20, 20/80, 10/90 and 5/95, respectively, as the total addition amount of carbons were kept constant at 6 parts.

EXAMPLE 3

Sample No. 12 was obtained in the same manner as in Example 1 except that the composition A was previously kneaded using a kneader before the compositions A and B were dispersed using a ball mill.

EXAMPLE 4

| Composition A: | |
|---|---|
| Fine Grain Carbon | 3 parts |
| (Mean primary grain size: 8 mµ) | |
| Coarse Grain Carbon | 3 parts |
| (Mean primary grain size: 77 mµ) | |
| Nitrocellulose | 5 parts |
| Vinyl chloride-vinyl acetate Copolymer | 5 parts |
| Composition B: | |
| Co—added FeO$_x$ (x = 1.4) | 100 parts |
| Polyurethane | 2 parts |
| α-Al$_2$O$_3$ | 5 parts |
| Amyl Stearate | 1 part |
| Composition C: | |
| Polyamide | 3 parts |
| Epoxy Resin | 5 parts |
| Solvent: | |
| Toluene/Methyl Isobutyl Ketone (1/1) | 270 parts |

The composition A was kneaded with a kneader in advance, and it was placed in a ball mill together with the composition B and dispersed. Into the resulting dispersion was poured the composition C to prepare a magnetic coating composition. Thereafter, video tape (Sample No. 13) was obtained using this coating composition in the same manner as in Example 1.

COMPARATIVE EXAMPLE 2

Sample No. 14 was obtained in the same manner as in Example 1 except that the following magnetic coating composition was employed.

| Magnetic Coating Composition: | |
|---|---|
| Co—added γ-Fe$_2$O$_3$ | 100 parts |
| Fine-Grain Carbon | 3 parts |
| (Mean primary grain size: 14 mµ) | |
| Coarse Grain Carbon | 3 parts |
| (Mean primary grain size: 85 mµ) | |
| Vinyl Alcohol-containing Vinyl Chloride-vinyl Acetate Resin | 20 parts |
| Polyurethane Prepolymer | 13 parts |
| Cr$_2$O$_3$ | 0.9 part |
| Lauric Acid | 0.5 parts |
| Liquid Paraffin | 0.7 parts |
| Solvent (Methyl Isobutyl Ketone/Toluene = 1/1) | 270 parts |

COMPARATIVE EXAMPLE 3

Sample No. 15 was obtained in the same manner as in Example 1 except that a mean primary grain size of the fine grain carbon was changed to 14 mµ and a mean primary grain size of the coarse grain carbon was altered to 85 mµ.

Figure 1B:
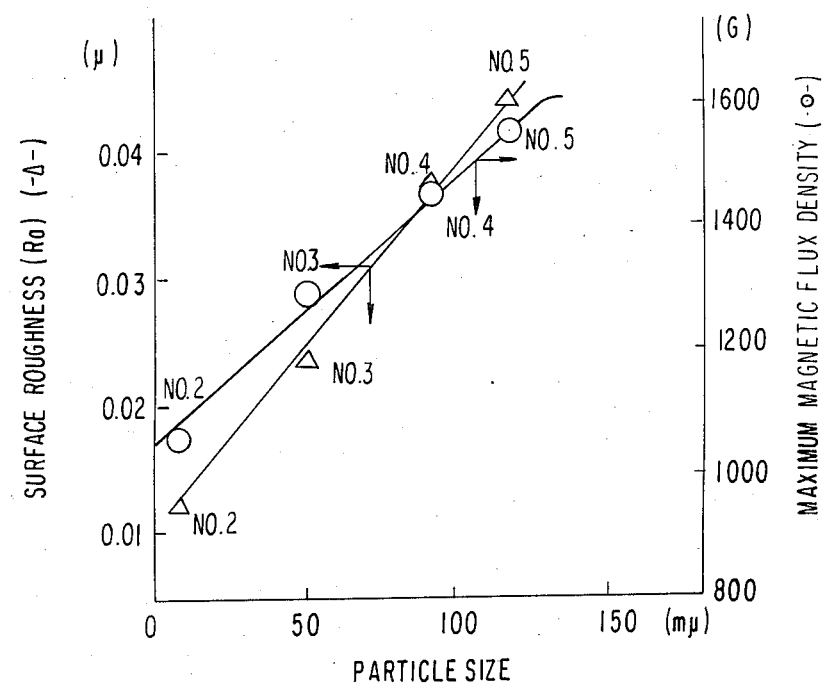
Figure 2A:
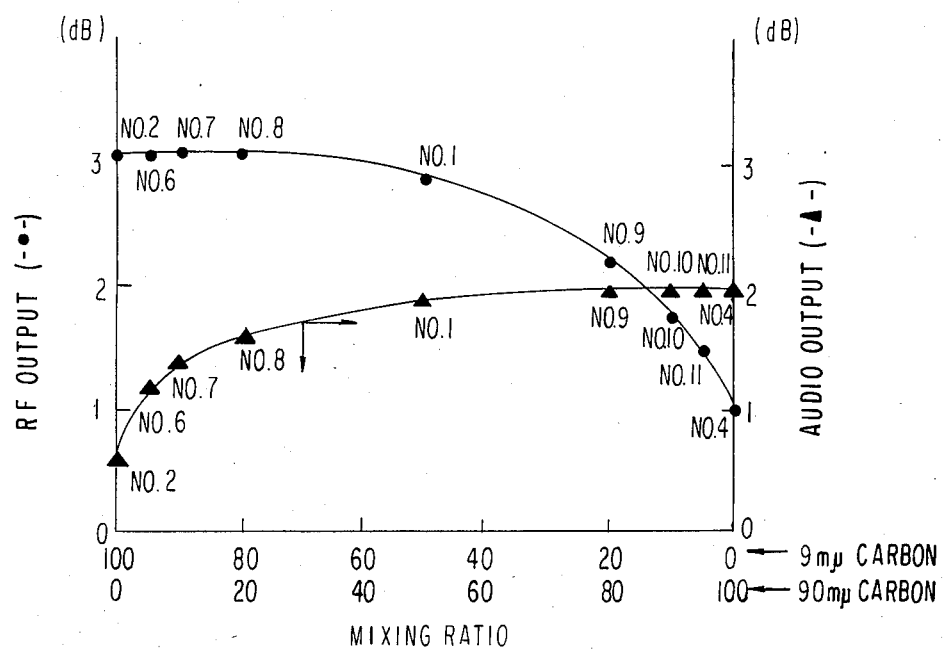
FIGS. 2-(a) and 2-(b) are graphic illustrations of characteristics of magnetic recording materials in which a combination of carbon black powders are used, wherein FIG. 2-(a) includes graphs showing the relationship between RF output (—●—) and the mixing ratio of carbon black powders and the relationship between audio output (—▲—) and the mixing ratio, and FIG. 2-(b) includes graphs showing the relationship between surface smoothness (—Δ—) and the mixing ratio and the relationship between maximum magnetic flux density (—○—) and the mixing ratio.
Figure 2B:
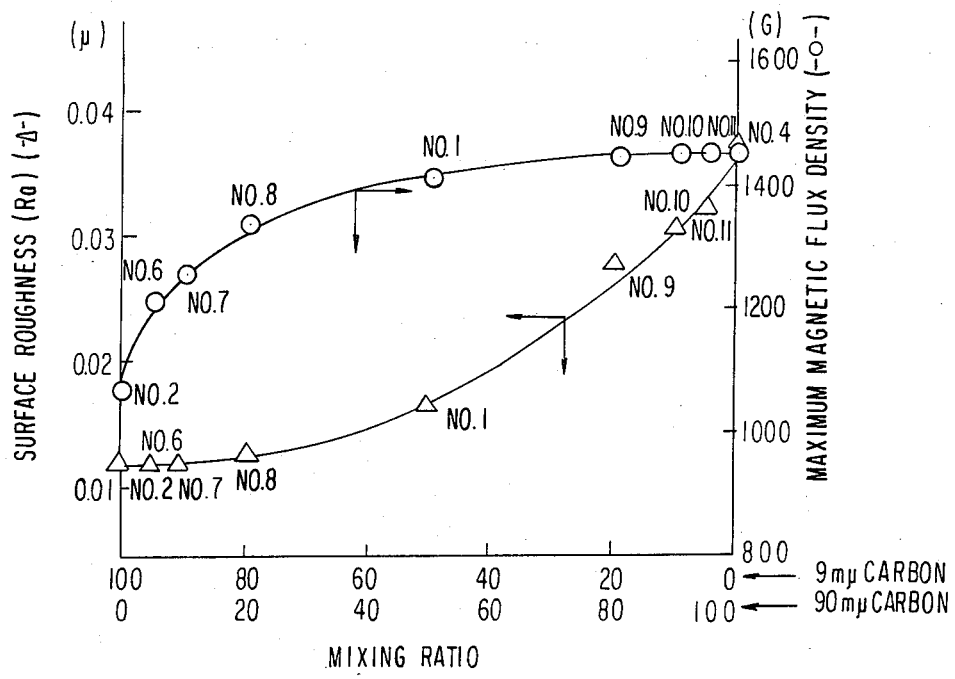

Results of evaluating the characteristics of these samples are set forth in Table 1, and illustrated in FIGS. 1-(a), 1-(b), 2-(a) and 2-(b).

TABLE 1

| Example No. | Sample No. | Carbon Black (Fine/Coarse) Size (mµ/mµ) | Mixing Ratio (by weight) | Amount Added*2 (parts) | RF Output (dB) | Audio Output (dB) | Ra (µ) | Bm G |
|---|---|---|---|---|---|---|---|---|
| Example 1 | 1 | 9/90 | 50/50 | 6 | 2.9 | 1.9 | 0.017 | 1400 |
| Comparative Example 1 | 2 | 9 | — | 6 | 3.1 | 0.6 | 0.012 | 1050 |
| Comparative Example 1 | 3 | 50 | — | 6 | 2.1 | 1.1 | 0.024 | 1280 |
| Comparative Example 1 | 4 | 90 | — | 6 | 1.0 | 2.0 | 0.038 | 1450 |
| Comparative Example 1 | 5 | 115 | — | 6 | 0.5 | 2.2 | 0.045 | 1550 |
| Example 2 | 6 | 9/90 | 95/5 | 6 | 3.1 | 1.2 | 0.012 | 1200 |
| " | 7 | " | 90/10 | 6 | 3.1 | 1.4 | 0.012 | 1240 |
| " | 8 | " | 80/20 | 6 | 3.1 | 1.6 | 0.013 | 1320 |
| " | 9 | " | 20/80 | 6 | 2.2 | 2.0 | 0.029 | 1440 |
| " | 10 | " | 10/90 | 6 | 1.8 | 2.0 | 0.032 | 1450 |
| " | 11 | " | 5/95 | 6 | 1.5 | 2.0 | 0.033 | 1450 |
| Example 3 | 12*1 | 9/90 | 50/50 | 6 | 3.5 | 2.3 | 0.016 | 1450 |
| Example 4 | 13*1 | 8/77 | 50/50 | 6 | 3.8 | 2.5 | 0.015 | 1500 |
| Comparative Example 2 | 14 | 14/85 | 50/50 | 6 | 1.7 | 1.2 | 0.022 | 1320 |
| Comparative Example 3 | 15 | 14/85 | 50/50 | 6 | 2.2 | 1.2 | 0.023 | 1290 |

Note:
*1 with kneader-processing
*2 per 100 parts of magnetic powder

Tapes prepared using the mixed carbons of the present invention possessed surface smoothness of the respective magnetic layers and amounts of ferromagnetic powder in the respective magnetic layers (maximum magnetic flux density) which were not simple arithmetic means of those obtained in individual magnetic recording materials in which only one kind of carbon having the corresponding grain size was used. Therefore, the samples of the present invention provide both high RF and audio outputs. The results in table 1 clearly show the synergistic effects obtained by utilizing the present invention.

As for the mixing ratio, good results are attained within the experimental range of 95/5 l to 5/95. Particularly, the range of 80/20 to 20/80 provides more excellent results.

On the other hand, the mixing of carbons according to the conventional process (see Sample No. 14) is inferior to that of the present invention.

The results of examining the characteristics of Sample No. 15 are almost equal to those of the sample No. 3 in Comparative Example 1 which contains only a single type of carbon having a grain size of 50 mµ which is nearly equal to the simple arithmetic mean (49.5 mµ) of the mean grain sizes of two kinds of carbon mixed. That is, Sample No. 15 differs from the samples of the present invention in that the combination effect owing to the mixing of two kinds of carbon black powders is not observed.

In addition, Sample No. 12 provides more excellent results than Sample No. 1 by virtue of changes in kneading and dispersing conditions. Sample No. 13 also, in which carbon black kneaded with a binder, the so-called carbon master batch, was used, provides better results than Sample No. 1.

It should also be noted that the RF output and audio output were measured using a VHS type VTR, and compared with those of the standard tape produced by Fuji Photo Film Co., Ltd. The smoothness of the magnetic layer surface was represented by the center line average roughness (Ra) (cutoff: 0.08 mm), and the amount of magnetic substance in the magnetic layer was represented by the maximum magnetic flux density measured under an external magnetic field of 2000 Oe using a vibrating sample type fluxmeter.

While the invention has been described in detail and with reference to specific embodiments thereof, it will be apparent to one skilled in the art that various changes and modifications can be made therein without departing from the spirit and scope thereof.

What is claimed is:

1. A magnetic recording material comprising a non-magnetic support base having coated thereon a magnetic layer, the magnetic layer comprising:
   a binder having dispersed therein;
   a ferromagnetic powder;
   a carbon black fine powder having a mean primary grain size ranging from 5 to 9 m$\mu$; and
   a carbon black coarse powder having a mean primary grain size in the range of 50 m$\mu$ to 120 m$\mu$, wherein the carbon black fine powder and the carbon black coarse powder are present in a mixing ratio ranging from 95/5 to 5/95 by weight.

2. A magnetic recording material as claimed in claim 1, wherein the carbon black coarse powder has a mean primary grain size within the range of 60 to 100 m$\mu$.

3. A magnetic recording material as claimed in claim 1, wherein the magnetic layer further comprises an abrasive having a mean particle size within the range of 0.1 to 1 $\mu$m and Mohs' hardness of not less than 6 in an amount within the range of 0.5 to 20 parts by weight per 100 parts by weight of the ferromagnetic powder.

4. A magnetic recording material as claimed in claim 1, wherein the carbon black fine powder and the carbon black coarse powder are present in a total amount within the range of 1 to 20 parts by weight per 100 parts by weight of the ferromagnetic powder.

5. A magnetic recording material as claimed in claim 4, wherein the total amount of the carbon black fine powder and carbon black coarse powder is within the range of 3 to 15 parts by weight per 100 parts by weight of the ferromagnetic powder.

6. A magnetic recording material as claimed in claim 1, wherein the mixing ratio of the carbon black fine powder to the carbon black coarse powder is within the range of 80/20 to 20/80 by weight.

7. A magnetic recording material as claimed in claim 6, wherein the mixing ratio of the carbon black fine powder to the carbon black coarse powder is within the range of 70/30 to 30/70 by weight.

* * * * *